(12) United States Patent
Harders et al.

(10) Patent No.: US 8,883,930 B2
(45) Date of Patent: Nov. 11, 2014

(54) PROCESS FOR PREPARING GRAFT POLYMERS WITHOUT INITIATOR AND WITHOUT SOLVENT AND BITUMEN/POLYMER COMPOSITIONS COMPRISING SAID GRAFT POLYMERS

(75) Inventors: Sylvia Harders, Buchholz (DE); Romuald Botel, Chonas l'Amballan (FR); Ilias Iliopoulos, Paris (FR); Ludwik Leibler, Paris (FR); Ornella Annabelle Zovi, Coulon (FR)

(73) Assignees: Total Marketing Services, Puteaux (FR); Centre National de la Recherche Scientifique (CNRS), Paris (FR)

( * ) Notice: Subject to any disclaimer, the term of this patent is extended or adjusted under 35 U.S.C. 154(b) by 41 days.

(21) Appl. No.: 13/809,546

(22) PCT Filed: Jul. 8, 2011

(86) PCT No.: PCT/IB2011/053060
§ 371 (c)(1),
(2), (4) Date: Jan. 10, 2013

(87) PCT Pub. No.: WO2012/007889
PCT Pub. Date: Jan. 19, 2012

(65) Prior Publication Data
US 2013/0131229 A1    May 23, 2013

(30) Foreign Application Priority Data
Jul. 12, 2010 (FR) .................................... 10 55674

(51) Int. Cl.
| | |
|---|---|
| *C08F 8/34* | (2006.01) |
| *C08C 19/20* | (2006.01) |
| *C08L 95/00* | (2006.01) |
| *C08J 3/24* | (2006.01) |
| *C08K 5/37* | (2006.01) |

(52) U.S. Cl.
CPC ............... *C08F 8/34* (2013.01); *C08L 2555/80* (2013.01); *C08C 19/20* (2013.01); *C08J 2351/04* (2013.01); *C08L 2555/22* (2013.01); *C08K 5/37* (2013.01); *C08F 2800/20* (2013.01); *C08L 95/00* (2013.01); *C08J 3/24* (2013.01)
USPC ........................................ 525/332.9; 525/350

(58) Field of Classification Search
CPC .................................. C08F 8/34; C08C 19/20
USPC ............................................... 525/332.9, 350
See application file for complete search history.

(56) References Cited

U.S. PATENT DOCUMENTS

| | | | |
|---|---|---|---|
| 5,070,150 A | 12/1991 | Hopper | |
| 6,313,205 B1 * | 11/2001 | Chiron et al. | ................ 524/262 |
| 7,312,264 B2 | 12/2007 | Gandon-Pain | |
| 8,202,922 B2 | 6/2012 | Botel et al. | |
| 8,273,809 B2 | 9/2012 | Chaverot et al. | |
| 2010/0190894 A1 | 7/2010 | Chaverot et al. | |
| 2012/0059094 A1 | 3/2012 | Chaverot et al. | |

FOREIGN PATENT DOCUMENTS

GB         1283613 A         8/1972

OTHER PUBLICATIONS

English Translation of the International Preliminary Report on Patentability, IB, Geneva, issued Jan. 15, 2013, incorporating the English Translation of the Written Opinion of the ISA, ISA/EP, Rijswijk, NL, mailed Oct. 14, 2011.

* cited by examiner

*Primary Examiner* — Vu A Nguyen
(74) *Attorney, Agent, or Firm* — Harness, Dickey & Pierce, P.L.C.

(57) ABSTRACT

A process for preparing graft polymers from a polymer is based on conjugated diene units and a graft which is a thiol derivative. The process has an absence of solvent and any radical initiator. The graft polymer can be advantageously be used as additive for a bitumen/polymer composition and in particular permits thermoreversible cross-linking.

14 Claims, No Drawings

PROCESS FOR PREPARING GRAFT POLYMERS WITHOUT INITIATOR AND WITHOUT SOLVENT AND BITUMEN/POLYMER COMPOSITIONS COMPRISING SAID GRAFT POLYMERS

CROSS-REFERENCE TO RELATED APPLICATIONS

This application is a National Phase Entry of International Application No. PCT/IB2011/053060, filed on Jul. 8, 2011, which claims priority to French Patent Application Serial No. 1055674, filed on Jul. 12, 2010, both of which are incorporated by reference herein.

TECHNICAL FIELD

The present invention relates to the field of bitumens, in particular to the field of bitumen/polymer compositions. The present invention relates to a process for preparing graft polymers in the absence of solvent and in the absence of external radical initiator and relates to the graft polymers that can be obtained by said process. Said graft polymers are particularly advantageous and can be used in the field of bitumens, and in particular in the field of bitumen/polymer compositions.

The invention also relates to bitumen/polymer compositions comprising bitumen and said graft polymers and the process of preparation thereof. The invention relates finally to the use of said graft polymers for preparing bitumen/polymer compositions, said bitumen/polymer compositions being cross-linked, preferably thermoreversibly.

BACKGROUND

In PCT applications WO200930840 and WO200930841, Applicant's Company described graft polymers obtained from reaction between polymers, in particular between thiol derivatives and copolymers based on conjugated diene units and aromatic monovinyl hydrocarbon units. The grafting reaction of the thiol derivatives on the polymers is described on page 13 lines 26 to 29 in the case of application WO200930840 and on page 13 lines 7 to 10 in the case of application WO200930841. The grafting reaction takes place in a reactor, under a nitrogen atmosphere, in the presence of a solvent such as toluene, at a temperature of 90° C., with stirring, for a duration of 3 to 4 hours, in the presence of a polymer, a thiol derivative that performs the role of graft and a radical initiator such as azobisisobutyronitrile (AIBN).

SUMMARY

Continuing its research, Applicant's company realized that the process for preparing graft polymers using thiol derivatives could be simplified and even improved. Thus, Applicant's company realized that the grafting reaction between a polymer based on conjugated diene units, in particular a copolymer based on conjugated diene units and aromatic monovinyl hydrocarbon units, such as a copolymer of styrene and butadiene, and a thiol derivative, in particular a paraffinic thiol derivative could take place in the absence of any solvent and in the absence of any external radical initiator, whether photochemical, thermal and/or redox, which greatly simplifies the implementation of the process for preparing graft polymers, and consequently the implementation of the process for preparing bitumen/polymer compositions comprising said graft polymers. This novel process of preparation is therefore easier to implement and does not require the use of flammable solvents, such as toluene, or of explosive products such as AIBN. Moreover, this novel process of preparation makes it possible to obtain grafting yields that are as high as, or even higher than those obtained during grafting in the presence of solvent and radical initiator. The process according to the invention makes it possible to obtain graft polymers that can be used in the field of bitumens, and in particular in the field of bitumen/polymer compositions.

The bitumen/polymer compositions comprising said graft polymers have good mechanical and elastic properties. The graft polymers make it possible to cross-link the bitumen/polymer compositions, and moreover thermoreversibly. The bitumen/polymer compositions according to the invention have a low viscosity, which makes it possible to handle them at lower temperatures and makes it possible to lower the temperatures of manufacture of coated products made from said bitumen/polymer compositions. The novel process for preparing bitumen/polymer compositions is also easier to implement, since the preparation of the graft polymers, the first step of the process for preparing bitumen/polymer compositions, is simplified.

A subject of the invention is a process for preparing graft polymers in the absence of solvent and of a source of radicals comprising the following steps:
(i) a thiol derivative is brought into contact with a polymer based on conjugated diene units at a temperature comprised between 20° C. and 120° C., for a duration of 10 minutes to 24 hours, then
(ii) the mixture is heated at a temperature comprised between 80° C. and 200° C. for a duration of 10 minutes to 48 hours.

Preferably, the temperature of step (i) is comprised between 30° C. and 110° C., preferably between 40° C. and 100° C., more preferably between 50° C. and 90° C., and even more preferably between 60° C. and 80° C. Preferably, the duration of step (i) is comprised between 30 minutes and 12 hours, preferably between 1 hour and 10 hours, more preferably between 2 hours and 8 hours, and even more preferably between 4 hours and 6 hours. Preferably, the temperature of step (ii) is comprised between 100° C. and 160° C., preferably between 120° C. and 140° C.

Preferably, the duration of step (ii) is comprised between 30 minutes and 24 hours, preferably between 1 hour and 12 hours, more preferably between 2 hours and 10 hours, and even more preferably between 4 hours and 8 hours. Preferably, a subsequent purification step is implemented. Preferably, steps (i) and/or (ii) are carried out with stirring.

Preferably, the thiol derivative has the general formula $C_nH_{2n+1}$—SH with n an integer comprised between 12 and 110, preferably between 18 and 90, more preferably between 22 and 80, and even more preferably between 40 and 70. Preferably, the polymer is a copolymer based on conjugated diene units and aromatic monovinyl hydrocarbon units. Preferably, the conjugated diene is chosen from butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, and mixtures thereof, in particular butadiene.

Preferably, the polymer based on conjugated diene units has a content of units with 1,2 double bonds originating from the conjugated diene between 5 and 50 wt. %, relative to the total weight of the conjugated diene units, preferably between 10% and 40%, more preferably between 15% and 30%, even more preferably between 20% and 25%, and even more preferably between 18% and 23%. Preferably, the molar ratio of the quantity of thiol derivative to the quantity of units with 1,2 double bonds originating from the conjugated diene is comprised between 0.01 and 5, preferably between 0.05 and 4, more preferably between 0.1 and 2, even more preferably between 0.5 and 1.5, and even more preferably between 0.8 and 1. Preferably, the aromatic monovinyl hydrocarbon is chosen from styrene, o-methylstyrene, p-methylstyrene, p-tert-butylstyrene, 2,3-dimethylstyrene, α-methyl-styrene, vinyl naphthalene, vinyl toluene, vinyl xylene and mixtures thereof, in particular styrene.

The invention also relates to a graft polymer that can be obtained by the process as defined above. Preferably, the graft polymer has a polydispersity index comprised between 1 and 4, preferably between 1.1 and 3, more preferably between 1.2 and 2, and even more preferably between 1.5 and 1.7. The invention also relates to a bitumen/polymer composition comprising at least one bitumen and at least one graft polymer that can be obtained by the process as defined here above. Preferably, the bitumen/polymer composition comprises from 0.1 to 30 wt. % of graft polymer relative to the weight of the bitumen/polymer composition, preferably between 0.5% and 20%, more preferably between 1% and 10%, and even more preferably between 2% and 5%.

The invention also relates to a process for preparing a bitumen/polymer composition in which at least one bitumen and at least one graft polymer that can be obtained by the process as defined above are mixed at a temperature comprised between 100° C. and 200° C., preferably between 120° C. and 180° C., more preferably between 140° C. and 160° C., until a final cross-linked bitumen/polymer composition is obtained. The invention also relates to the use of at least one graft polymer that can be obtained by the process as defined above for preparing a bitumen/cross-linked polymer composition, preferably thermoreversibly. The invention also relates to a bituminous coated material comprising granules and a bitumen/polymer composition as defined above.

DETAILED DESCRIPTION

The process according to the invention uses at least one polymer. This polymer is a polymer based on conjugated diene units, preferably a copolymer based on conjugated diene units and aromatic monovinyl hydrocarbon units. The conjugated diene is chosen from those comprising from 4 to 8 carbon atoms, such as 1,3-butadiene (butadiene), 2-methyl-1,3-butadiene (isoprene), 2,3-dimethyl-1,3-butadiene, 1,3-pentadiene, 1,2-hexadiene, chloroprene, carboxylated butadiene and/or carboxylated isoprene. The conjugated diene is preferably butadiene. The polymer can for example be a polybutadiene. The aromatic monovinyl hydrocarbon is chosen from styrene, o-methylstyrene, p-methylstyrene, p-tert-butylstyrene, 2,3-dimethylstyrene, a-methylstyrene, vinyl naphthalene, vinyl toluene and/or vinyl xylene. Preferably, the monovinyl hydrocarbon is styrene. The polymer can for example be a copolymer of styrene and butadiene.

Preferably, the polymer according to the invention consists of one or more copolymers chosen from copolymers of aromatic monovinyl hydrocarbon and conjugated diene, in particular of styrene and butadiene. These copolymers of aromatic monovinyl hydrocarbon and conjugated diene, in particular of styrene and butadiene, can be linear and/or star, in diblock, triblock and/or multibranched form. These copolymers of aromatic monovinyl hydrocarbon and conjugated diene, in particular of styrene and butadiene, optionally comprise a random hinge.

Preferably the polymer is a diblock or triblock copolymer of aromatic monovinyl hydrocarbon and conjugated diene, in particular a diblock or triblock copolymer of styrene and butadiene. The copolymer of aromatic monovinyl hydrocarbon and conjugated diene, in particular of styrene and butadiene, advantageously has a content by weight of aromatic monovinyl hydrocarbon, in particular of styrene in the range from 5 to 50 wt. %, relative to the weight of copolymer, preferably from 20 to 40%. The copolymer of aromatic monovinyl hydrocarbon and conjugated diene, in particular of styrene and butadiene, advantageously has a content by weight of conjugated diene, in particular of butadiene in the range from 50 to 95 wt. %, relative to the weight of the copolymer, preferably from 60% to 80%. It is on these conjugated diene units that the thiol derivative will react. Among these conjugated diene units, a distinction is made between units with 1,4 double bonds originating from the conjugated diene and units with 1,2 double bonds derived from the conjugated diene.

By "units with 1,4 double bonds originating from the conjugated diene" is meant the units obtained via a 1,4 addition during polymerization of the conjugated diene. By "units with 1,2 double bonds derived from the conjugated diene" is meant the units obtained via a 1,2 addition during polymerization of the conjugated diene. The result of this 1,2 addition is a so-called "pendant" vinylic double bond. It is on these 1,4 units originating from the conjugated diene and/or 1,2 originating from the conjugated diene that the thiol derivative will react. In particular, the pendant vinylic double bonds are particularly reactive and the grafting reaction takes place preferentially on these pendant vinylic double bonds.

Preferably, the copolymer of aromatic monovinyl hydrocarbon and conjugated diene, in particular of styrene and butadiene, has a content of units with 1,2 double bonds derived from the conjugated diene, in particular derived from butadiene, between 5 and 50 wt. %, relative to the total weight of the conjugated diene units, in particular butadiene, preferably between 10% and 40%, more preferably between 15% and 30%, even more preferably between 20% and 25%, and even more preferably between 18% and 23%. The polymer according to the invention, in particular the copolymer of aromatic monovinyl hydrocarbon and conjugated diene, in particular of styrene and butadiene, has an average molecular weight $M_w$ between 10,000 and 500,000 dalton, preferably between 50,000 and 200,000, more preferably between 80,000 and 150,000, and even more preferably between 100,000 and 130,000, and even more preferably between 110,000 and 120,000. The molecular weight of the copolymer is measured by gel permeation chromatography GPC with a polystyrene standard according to standard ASTM D3536.

The process according to the invention uses at least one graft which is a thiol derivative. This graft or thiol derivative comprises at least one saturated, linear or branched hydrocarbon chain, with at least 12 carbon atoms, preferably with at least 18 carbon atoms, more preferably with at least 22 carbon atoms, even more preferably with at least 30 carbon atoms, and even more preferably with at least 40 carbon atoms. More particularly, the thiol derivative or graft comprises at least one saturated, linear or branched hydrocarbon chain, with 12 to 110 carbon atoms, preferably 18 to 90, more preferably 22 to 80, and even more preferably 40 to 70. More particularly, the thiol derivative or graft has as its general formula the following formula (I): $C_nH_{2n+1}$—SH, where n is an integer comprised between 12 and 110, preferably between 18 and 90, more preferably between 22 and 80, and even more preferably between 40 and 70. The preferred thiol derivatives or grafts include the thiols: $C_{18}H_{37}$—SH, $C_{40}H_{81}$—SH, $C_{70}H_{141}$—SH and $C_{90}H_{181}$—SH, with a distribution centred around these values. The commercially available thiol $C_{18}H_{37}$—SH is preferred.

The process according to the invention is characterized by a reaction between the polymer described above and the graft described above, moreover in the absence of any solvent and any external radical initiator, contrary to what has been described in the prior art. The polymer and graft are capable of reacting together to form a graft polymer—it is not necessary to add solvent and/or radical initiator.

The process according to the invention is characterized by two successive reaction steps. The first step comprises premixing the polymer and graft, which permits the polymer and graft to be homogenized under mild conditions. The second step comprises the grafting reaction proper, i.e. reaction between the polymer and the graft to form the graft polymer under somewhat harsher conditions, which will lead to the grafting of the thiol derivative onto the conjugated diene units of the polymer.

The first step of the process takes place at a temperature comprised between 20° C. and 120° C., preferably between 30° C. and 110° C., more preferably between 40° C. and 100° C., even more preferably between 50° C. and 90° C., and even more preferably between 60° C. and 80° C. The grafts used in this process melt at the temperatures mentioned above and thus permit swelling of the polymer. As the grafts are liquid at the temperatures mentioned above, they behave as a solvent for the polymer, which means that addition of an additional solvent is therefore unnecessary for homogenizing the polymer/graft mixture. If the thiol derivative (or graft) has a melting point higher than the temperatures mentioned above, the graft is not completely liquid and cannot swell the polymer completely. Homogenization of the graft/polymer mixture is then carried out for example using a mixer or an extruder, or any other equipment for mixing reactants that are in solid and/or powder form.

Optionally, swelling and solubilization of the reactants, i.e. of the polymer and of the graft, can also be promoted by adding organic solvent to the polymer and to the graft, said solvent then being evaporated completely before the second step of grafting. Toluene or any other usual organic solvent such as xylene, chloroform, dichloromethane, or light alkanes such as hexane, heptane, octane, etc., are preferably used.

Preferably, the quantity of organic solvent is such that the concentration of polymer by weight is comprised between 2 and 70 wt. %, preferably between 4 and 50%, more preferably between 5 and 30%, and even more preferably between 8 and 20% in said solvent. This solvent is then evaporated. The polymer/graft mixture will comprise a maximum quantity of solvent of 10 wt. % relative to the weight of the polymer/graft mixture, preferably 5%, more preferably 3%, and even more preferably 1%.

An inert atmosphere can also optionally be used for this first step of the process, such as an inert atmosphere of nitrogen or of argon. The first step of the process can be carried out with or without mechanical stirring. The homogenization of the polymer/graft mixture can be improved by using any type of mechanical stirring.

The duration of the first reaction step is comprised between 10 minutes and 24 hours, preferably between 30 minutes and 12 hours, more preferably between 1 hour and 10 hours, even more preferably between 2 hours and 8 hours, and even more preferably between 4 hours and 6 hours. The duration of this pre-mixing depends on the efficiency of the homogenization system used, whether it is for example a reactor equipped with a mechanical stirrer, a mixer or a simple reactor without stirring. The duration will thus be greater when no stirring is present and less in the case of a mixer.

The weight ratio of the quantity of graft to the quantity of polymer is comprised between 0.01 and 5, preferably between 0.05 and 4, more preferably between 0.1 and 2, even more preferably between 0.5 and 1.5, and even more preferably between 0.8 and 1. The molar ratio of the quantity of graft to the quantity of 1,2 units originating from the conjugated diene is comprised between 0.01 and 5, preferably between 0.05 and 4, more preferably between 0.1 and 2, even more preferably between 0.5 and 1.5, and even more preferably between 0.8 and 1.

The temperature of the second step of the process is comprised between 80° C. and 200° C., preferably between 100° C. and 160° C., and more preferably between 120° C. and 140° C. This second step of grafting does not require the use of a radical initiator. Grafting takes place even without the use of a radical initiator, and moreover while limiting the undesirable secondary reactions of chain coupling and cleavage. An inert atmosphere can also optionally be used for this second step of the process, such as an inert atmosphere of nitrogen, or of argon. The second step of the process can be carried out with or without mechanical stirring. Grafting can be improved by using any type of mechanical stirring.

The duration of the second reaction step is comprised between 10 minutes and 48 hours, preferably between 30 minutes and 24 hours, more preferably between 1 hour and 12 hours, even more preferably between 2 hours and 10 hours, and even more preferably between 4 hours and 8 hours. The duration of grafting depends on the efficiency of the homogenization system used, whether it is for example a reactor equipped with a mechanical stirrer, a mixer or a simple reactor without stirring. The duration will thus be greater when no stirring is present, and less in the case of a mixer.

At the end of this second step of the grafting reaction, the graft polymer obtained can optionally be purified by the usual purification techniques, but this purification stage is not essential, since the process according to the invention makes it possible to limit the quantity of unreacted graft. Once the two reaction steps are completed, the graft polymer can be purified for example by precipitation in a solvent such as methanol. An antioxidant such as 2,6-di-tert-butyl-4-methylphenol can optionally be added to the graft polymer obtained. This antioxidant can be added with a solvent such as toluene, and said solvent is then evaporated.

This novel process of preparation supplies graft polymers of higher purity, which can thus be used as they are, without further purification. This novel process of preparation supplies graft polymers that have a lower polydispersity index, a narrower distribution of molecular weights, and less chain cleavage and/or chain branching. The graft polymer obtained according to the process described above has a polydispersity index I=Mw/Mn less than that of a graft polymer obtained according to the process described in the prior art using a radical initiator and solvent. The graft polymer obtained according to the process described above has a polydispersity index comprised between 1 and 4, preferably between 1.1 and 3, more preferably between 1.2 and 2, and even more preferably between 1.5 and 1.7. The graft polymer according to the invention can easily be differentiated from a graft polymer obtained in solution, in particular by gel permeation chromatography (GPC).

The proportion of a compound relative to all of the repeat units, for example styrene and butadiene in a copolymer such as a copolymer of styrene and butadiene, is defined by mol. %. The proportion of a compound relative to the total weight of graft copolymer is defined by wt. %. The grafting yield is defined as the quantity of thiol derivative grafted relative to the quantity of thiol derivative introduced. The yields of the grafting process are comprised between 10% and 99%, preferably between 20% and 90%, more preferably between 30% and 80%, even more preferably between 40% and 70%, and even more preferably between 50% and 60%.

The bitumen which can be used according to the invention can be a bitumen originating from different sources. The bitumen which can be used according to the invention can be chosen from bitumens of natural origin, such as those contained in deposits of natural bitumen, of natural asphalt or bituminous sands. The bitumen which can be used according to the invention can also be a bitumen or a mixture of bitumens originating from the refining of crude oil, such as bitumens from direct distillation or bitumens from distillation at reduced pressure or blown or semi-blown bitumens, residues from propane deasphalting or pentane deasphalting, visbreaking residues, these various cuts being able to be used alone or mixed. The bitumens used can also be bitumens fluxed by adding volatile solvents, fluxes originating from oil, carbochemical fluxes and/or fluxes of vegetable origin. It is also possible to use synthetic bitumens, also called clear bitumens, bitumens that can be pigmented or bitumens that can be coloured. The bitumen can be a bitumen of naphthenic or paraffinic origin, or a mixture of these two bitumens.

The bitumen/polymer compositions comprise from 0.1 to 30 wt. %, relative to the weight of the bitumen/polymer composition, of graft polymer, preferably from 0.5 to 20%, more preferably from 1 to 10%, and even more preferably from 2 to 5%. The other polymers optionally present in the bitumen/polymer compositions are polymers which can be used in a standard fashion in the field of bitumen/polymer compositions, such as for example the triblock copolymers of an aromatic monovinyl hydrocarbon block and a conjugated diene block such as the styrene/butadiene/styrene SBS triblock copolymers, the multibranched copolymers of aromatic monovinyl hydrocarbon blocks and a conjugated diene block, such as the styrene/butadiene (SB)nX multibranched block copolymers, copolymers of an aromatic monovinyl hydrocarbon block and a "random" conjugated diene block such as the styrene/butadiene rubber SBR copolymers, polybutadienes, polyisoprenes, powdered rubber originating from tyre recycling, butyl rubbers, polyacrylates, polymethacrylates, polychloroprenes, polynorbornenes, polybutenes, polyisobutenes, polyolefins such as polyethylenes, polypropylenes, copolymers of ethylene and vinyl acetate, copolymers of ethylene and methyl acrylate, copolymers of ethylene and butyl acrylate, copolymers of ethylene and maleic anhydride, copolymers of ethylene and glycidyl methacrylate, copolymers of ethylene and glycidyl acrylate, copolymers of ethylene and propylene, ethylene/propylene/diene (EPDM) terpolymers, acrylonitrile/butadiene/styrene (ABS) terpolymers, ethylene/alkyl acrylate or methacrylate/glycidyl acrylate or methacrylate terpolymers and in particular ethylene/methyl acrylate/glycidyl methacrylate terpolymers and ethylene/alkyl acrylate or methacrylate/maleic anhydride terpolymers and in particular ethylene/butyl acrylate/maleic anhydride terpolymers.

In addition to bitumen and graft polymers, other optional ingredients commonly used in bitumens can be present. These ingredients can be waxes, such as polyethylene waxes, Fischer-Tropsch waxes, resins, oils of petroleum and/or vegetable origin, adhesiveness dopes and/or acids such as polyphosphoric acid and derivatives thereof.

The bitumen/polymer compositions are prepared by mixing the graft polymer and the bitumen. Mixing takes place at a temperature comprised between 100 and 200° C., preferably between 120° C. and 180° C., more preferably between 140° C. and 160° C., for a duration of 30 minutes to 4 hours, preferably 1 hour to 2 hours, optionally with stirring. This process for preparing bitumen/polymer compositions is very easy to implement since the graft polymer is obtained by means of the two reaction steps described above, without external initiator and without solvent, then the graft polymer is added to the bitumen. The process for preparing bitumen/polymer compositions is characterized by the two steps (i) and (ii) described below, optionally followed by purification of the graft polymer, then mixing with the bitumen at the temperatures and for the durations stated above.

The graft polymers obtained according to the process described above can be used in the field of bitumens, in roadmaking and/or in industry. The graft polymers make it possible to formulate bituminous compositions and in particular bitumen/polymer compositions that are cross-linked, preferably thermoreversibly. The cross-linking of the bitumen/polymer compositions comprising said graft polymers can be demonstrated by submitting these bitumen/polymer compositions to tensile testing according to standard NF EN 13587. The cross-linked bitumen/polymer compositions have higher tensile strength than the non-cross-linked bitumen/polymer compositions.

A higher tensile strength is reflected in a high elongation at break or maximum elongation (c max in %), a high breaking stress or stress at maximum elongation (σεmax in MPa), a high conventional energy at 400% (E 400% in $J/cm^2$) and/or a high total energy (E total in J). The cross-linked bitumen/polymer compositions have a maximum elongation, according to standard NF EN 13587, greater than or equal to 400%, preferably greater than or equal to 500%, more preferably greater than or equal to 600%, and even more preferably greater than or equal to 700%. The cross-linked bitumen/polymer compositions have a stress at maximum elongation, according to standard NF EN 13587, greater than or equal to 0.2 MPa, preferably greater than or equal to 0.4 MPa, more preferably greater than or equal to 0.6 MPa, and even more preferably greater than or equal to 1 MPa.

The cross-linked bitumen/polymer compositions have a conventional energy at 400%, according to standard NF EN 13587, greater than or equal to 3 $J/cm^2$, preferably greater than or equal to 5 $J/cm^2$, more preferably greater than or equal to 10 $J/cm^2$, and even more preferably greater than or equal to 15 $J/cm^2$. The cross-linked bitumen/polymer compositions have a total energy, according to standard NF EN 13587, greater than or equal to 1 J, preferably greater than or equal to 2 J, more preferably greater than or equal to 4 J, and even more preferably greater than or equal to 5 J.

Applicant's company realized that cross-linked bitumen/polymer compositions could be obtained using the graft polymers obtained by said process. This effect is particularly pronounced when the graft polymer is synthesized from a copolymer based on conjugated diene units and aromatic monovinyl hydrocarbon units that has a content of units with 1,2 double bonds originating from the conjugated diene greater than or equal to 5 wt. %, relative to the total weight of the conjugated diene units, preferably between 5 and 50 wt. %, more preferably between 10% and 40%, even more preferably between 15% and 30%, even more preferably between 20% and 25%, and even more preferably between 18% and 23%. Moreover, the bitumen/polymer compositions are cross-linked thermoreversibly, which is reflected in lower viscosities for the bitumen/polymer compositions according to the invention.

The bitumen/polymer compositions comprising the graft polymers can be intended for the manufacture of coated materials, of surface coatings (roadmaking applications) or membranes, sealing coats (industrial applications). The bituminous coated material comprises from 1 to 10 wt. % of bitumen/polymer composition, relative to the total weight of the coated material, preferably from 4 to 8 wt. %. The use of graft polymers in bitumen/polymer compositions, during manufacture of a coated material, makes it possible to lower the temperatures of manufacture or coating, of spreading and of compacting relative to the temperatures normally used, on account of thermoreversible cross-linking.

EXAMPLES

Graft polymers and bitumen/polymer compositions are prepared from:
bitumen of penetrability equal to 53 1/10 mm according to standard EN 1426,
styrene/butadiene diblock copolymer $SB_0$ with random hinge having a molecular weight $M_w$ equal to 120,000 g·mol$^{-1}$, a molecular weight $M_n$ equal to 115,000 g·mol$^{-1}$, a percentage by weight of styrene of 23%, relative to the weight of the copolymer, including 18% in the form of block and a percentage by weight of butadiene of 77%, relative to the weight of the copolymer, the percentage by weight of units with 1,2 double bonds derived from the butadiene being 7% relative to the percentage by weight of butadiene,
styrene/butadiene diblock copolymer $SB_1$ with random hinge having a molecular weight $M_w$ equal to 130,000 g·mol$^{-1}$, a molecular weight $M_n$ equal to 125,000 g·mol$^{-1}$, a percentage by weight of styrene, relative to the weight of the copolymer, of 30% including 19% in the form of block and a percentage by weight of butadiene of 70%, relative to the weight of the copolymer, the quantity of units with 1,2 double bonds derived from butadiene being 15% relative to the percentage by weight of butadiene,
thiol derivative of formula $C_{18}H_{37}$—SH.

Graft polymer $PG_1$ (Control)
100 ml of toluene is introduced into a 250-ml three-necked flask equipped with a condenser and a nitrogen supply, and the solvent is degassed for 30 minutes while bubbling with nitrogen. Then 4 g of copolymer $SB_1$ ($5.19 \times 10^{-2}$ mol of butadiene including $1.10 \times 10^{-2}$ mol of 1,2 butadiene) is introduced and left to dissolve with magnetic stirring at 400 rpm for 1 hour. Then 3.17 g of thiol derivative ($1.10 \times 10^{-2}$ mol) and then 18.1 mg ($1.10 \times 10$ mol) of radical initiator azobisisobutyronitrile (AIBN) are introduced. The solution is heated at 90° C., still under an inert atmosphere, for 3.5 hours. At the end of the reaction, the heating is stopped by removing the flask from the oil bath and the nitrogen and left to cool down to ambient temperature, after adding 4 mg of BHT (2,6-di-tert-butyl-4-methylphenol) to the reaction mixture.

Graft Polymer $PG_2$ (Control)
The same procedure is followed as for the graft polymer $PG_1$, carrying out a subsequent purification step. 100 ml of solution is precipitated from 800 ml of methanol. The precipitate is recovered by filtration and redissolved in 25 ml of toluene for carrying out the addition of antioxidant (4 mg of BHT). Then the solution is poured into a Teflon mould and left to evaporate under a hood for 48 hours.

Graft Polymer $PG_3$ (According to the Invention)
15.8 g of thiol derivative ($5.52 \times 10^{-2}$ mol) and 20 g of copolymer $SB_1$ ($2.59 \times 10^{-1}$ mol of butadiene including $5.52 \times 10^{-2}$ mol of 1,2 butadiene) are introduced into a 250-ml reactor equipped with a mechanical stirrer, a nitrogen inlet and a nitrogen outlet. The mixture is stirred at 50 rpm for 4 hours at 40° C. under an inert atmosphere. The temperature is increased to 100° C. The mixture is stirred at 50 rpm for 24 hours under an inert atmosphere. The stirring is stopped and the mixture cooled down to ambient temperature under an inert atmosphere. Toluene is added to the reactor so as to obtain a solution at 4 wt. % and the antioxidant BHT is introduced at 1/1000 wt. % relative to the copolymer. The solution is poured into a Teflon mould, then the solvent is left to evaporate at ambient temperature.

Graft Polymer $PG_4$ (According to the Invention)
The same procedure is followed as for the graft polymer $PG_3$, carrying out a subsequent purification step. Once the two reaction steps have been carried out, the stirring is stopped and the mixture cooled down to ambient temperature under an inert atmosphere. 100 ml of solution is precipitated from 800 ml of methanol. The graft copolymer is recovered and dried for 1 hour at ambient temperature. The copolymer is dissolved in toluene and then BHT is added. Pour the solution into a Teflon mould, then leave the solvent to evaporate at ambient temperature.

The results are presented in Table 1 below.

TABLE 1

| Copolymer | $SB_1$ | $PG_1$ | $PG_2$ | $PG_3$ | $PG_4$ |
|---|---|---|---|---|---|
| $M_n$ (kg/mol) | 125 | 165 | 140 | 85 | 87 |
| $M_w$ (kg/mol) | 130 | 320 | 320 | 130 | 140 |
| $I = M_w/M_n$ | 1.04 | 1.94 | 2.28 | 1.53 | 1.61 |
| mol. % C18 | — | — | 6.8 | — | 12.3 |
| wt. % C18 | — | — | 23.6 | — | 35.9 |
| Grafting yield | — | — | 39.0 | — | 71.0 |

It is noted that the grafting yield is higher when the process according to the invention is used, rather than the solution process of the prior art. It is also noted that the polydispersity indices of the graft polymers vary much more when the graft polymers are synthesized in solution, as is the case in the prior art. The polydispersity indices of the graft polymers synthesized by the process according to the invention without solvent and without radical initiator are lower than those of the graft polymers synthesized in solution.

The process according to the invention therefore has the advantage of being simpler to implement and of giving higher yields. Moreover, it supplies graft polymers with lower polydispersity. Bitumen/polymer compositions are then prepared from the graft polymers obtained above and the bitumen described above.

Control Bitumen/Polymer Composition $T_0$
A control bitumen/polymer composition $T_0$ is prepared, in which the bitumen/polymer composition is cross-linked with sulphur (vulcanization). 94.87 wt. % of bitumen and 5 wt. % of copolymer $SB_0$ are introduced into a reactor maintained at 185° C. and with stirring at 300 rpm. The reactor contents are then maintained at 185° C. with stirring at 300 rpm for 4 hours. Then 0.13 wt. % of flowers of sulphur, relative to the weight of the bitumen/polymer composition, is introduced into the reactor. The reactor contents are maintained at 185° C. with stirring at 300 rpm for 2 hours.

Control Bitumen/Polymer Composition $T_1$
A control bitumen/polymer composition $T_1$ is prepared in which the bitumen/polymer composition is cross-linked using a control graft polymer $PG_1$ obtained in solution. 93.17 wt. % of bitumen and 6.83 wt. % of graft polymer $PG_1$ are introduced into a reactor maintained at 185° C. and with stirring at 300 rpm. The reactor contents are then maintained at 185° C. with stirring at 300 rpm for 4 hours.

Control Bitumen/Polymer Composition $T_2$
A control bitumen/polymer composition $T_2$ is prepared in which the bitumen/polymer composition is cross-linked using a control graft polymer $PG_2$ obtained in solution. 95 wt. % of bitumen and 5 wt. % of graft polymer $PG_2$ are introduced into a reactor maintained at 185° C. and with stirring at 300 rpm. The reactor contents are then maintained at 185° C. with stirring at 300 rpm for 4 hours.

Bitumen/Polymer Composition According to the Invention $C_3$

A bitumen/polymer composition according to the invention $C_3$ is prepared in which the bitumen/polymer composition is cross-linked using a graft polymer according to the invention $PG_3$. 94.23 wt. % of bitumen and 5.73 wt. % of graft polymer $PG_3$ are introduced into a reactor maintained at 185° C. and with stirring at 300 rpm. The reactor contents are then maintained at 185° C. with stirring at 300 rpm for 4 hours.

Bitumen/Polymer Composition According to the Invention $C_4$

A bitumen/polymer composition according to the invention $C_4$ is prepared in which the bitumen/polymer composition is cross-linked by means of a graft polymer according to the invention $PG_4$. 95 wt. % of bitumen and 5 wt. % of graft polymer $PG_4$ are introduced into a reactor maintained at 185° C. and with stirring at 300 rpm. The reactor contents are then maintained at 185° C. with stirring at 300 rpm for 4 hours.

The results are presented in Table 2 below.

TABLE 2

|  | $T_0$ | $T_1$ | $T_2$ | $C_3$ | $C_4$ |
|---|---|---|---|---|---|
| $P_{25}$ (1/10 mm) [1] | 36 | 73 | 49 | 59 | 50 |
| RBT (° C.) [2] | 64.2 | 64.4 | 69.9 | 51.6 | 54.4 |
| IP [3] | 1.0 | 2.9 | 2.8 | −0.4 | −0.2 |
| σ threshold (MPa) [4] | 1.33 | 1.11 | 1.62 | 1.26 | 1.35 |
| σ ε max (MPa) [4] | 0.6 | 0.28 | 0.47 | 0.20 | 0.27 |
| ε threshold (%) [4] | 13.6 | 12.44 | 11.02 | 11.52 | 10.93 |
| ε max (%) [4] | 700 | 700 | 700 | 641 | 700 |
| E 400% (J/cm$^2$) [4] | 12 | 8.20 | 12.13 | 9.19 | 9.92 |
| E total (J) [4] | 2.45 | 1.42 | 2.24 | 1.64 | 1.80 |
| Viscosity 80° C. (Pa·s) [5] | 65.00 | 33.00 | 55.00 | 31.00 | 27.00 |
| Viscosity 100° C. (Pa·s) [5] | 17.49 | 9.75 | 13.70 | 8.25 | 9.15 |
| Viscosity 120° C. (Pa·s) [5] | 4.80 | 2.61 | 3.63 | 2.15 | 2.30 |
| Viscosity 140° C. (Pa·s) [5] | 1.61 | 0.93 | 1.20 | 0.78 | 0.81 |
| Viscosity 160° C. (Pa·s) [5] | 0.69 | 0.42 | 0.52 | 0.35 | 0.36 |
| Viscosity 180° C. (Pa·s) [5] | 0.34 | 0.22 | 0.26 | 0.18 | 0.19 |
| Viscosity 200° C. (Pa·s) [5] | 0.20 | 0.13 | 0.16 | 0.11 | 0.11 |

[1] penetrability at 25° C. denoted $P_{25}$ (1/10 mm) measured according to standard EN 1426,
[2] Ring & Ball temperature denoted RBT (° C.) measured according to standard EN 1427
[3] Pfeiffer index designated IP defined by the following formula:

$$IP = \frac{1952 - 500 \times \log(P_{25}) - 20 \times RBT}{50 \times \log(P_{25}) - RBT - 120}$$

[4] threshold stress designated σ threshold (MPa), stress at maximum elongation designated σ ε max (MPa), threshold elongation designated ε threshold (%), maximum elongation designated ε max (%), conventional energy of elongation at 400% designated E 400% (J/cm$^2$), total energy designated E total (J), measured according to standard NF EN 13587, tensile testing being carried out at 5° C. with a stretching rate of 500 mm/minute,
[5] viscosities at different temperatures (Pa·s) measured according to standard NF EN 13702-1.

The results in this table show that the viscosities from 80° C. to 200° C. of the bitumen/polymer compositions according to the invention $C_3$ and $C_4$ are always lower than those of the control composition $T_o$. The bitumen/polymer compositions according to the invention $C_3$ and $C_4$ are therefore less viscous than a bitumen/polymer composition cross-linked with sulphur. Low viscosities at the temperatures of use are therefore achieved with the bitumen/polymer compositions according to the invention. Reductions of the order of 20° C. are obtained by means of the bitumen/polymer compositions according to the invention. It will be possible for coated materials to be manufactured at lower temperatures from the bitumen/polymer compositions according to the invention.

Moreover, it is noted that the elastic properties of the bitumen/polymer compositions according to the invention are very satisfactory and very similar to those of the control composition $T_0$. At the implementation temperatures, the bitumen/polymer compositions according to the invention $C_3$ and $C_4$ are therefore elastic (just like the control compositions $T_0$, $T_1$ and $T_2$), while displaying reduced viscosity at the implementation temperatures relative to the control compositions $T_0$, $T_1$ and $T_2$, which are much more viscous.

The invention claimed is:

1. A process for preparing graft polymers in the absence of a solvent and of a source of radicals, the process comprising:
   (i) bringing a thiol derivative into contact with a polymer based on conjugated diene units at a temperature between 20° C. and 120° C., for a duration of 10 minutes to 24 hours to create a mixture; and then
   (ii) heating the mixture at a temperature between 80° C. and 200° C. for a duration of 10 minutes to 48 hours.

2. The process of preparation according to claim 1, wherein the temperature of step (i) is between 30° C. and 110° C.

3. The process of preparation according to claim 1, wherein the duration of step (i) is between 30 minutes and 12 hours.

4. The process of preparation according to claim 1, wherein the temperature of step (ii) is between 100° C. and 160° C.

5. The process of preparation according to claim 1, wherein the duration of step (ii) is between 30 minutes and 24 hours.

6. The process of preparation according to claim 1, wherein a subsequent purification step is implemented.

7. The process of preparation according to claim 1, wherein steps (i) and/or (ii) are carried out with stirring.

8. The process of preparation according to claim 1, wherein the thiol derivative has the general formula $C_nH_{2n+1}$—SH where n is an integer between 12 and 110.

9. The process of preparation according to claim 1, wherein the polymer is a copolymer based on conjugated diene units and aromatic monovinyl hydrocarbon units.

10. The process of preparation according to claim 1, wherein the conjugated diene is chosen from butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, and mixtures thereof.

11. The process of preparation according to claim 1, wherein the polymer based on conjugated diene units has a content of units with 1,2 double bonds originating from the conjugated diene between 5 and 50 wt. %, relative to the total weight of the conjugated diene units.

12. The process of preparation according to claim 1, wherein the molar ratio of the quantity of thiol derivative to the quantity of units with 1,2 double bonds originating from the conjugated diene is between 0.01 and 5.

13. The process of preparation according to claim 9, wherein the aromatic monovinyl hydrocarbon is chosen from styrene, o-methylstyrene p-methylstyrene, p-tert-butylstyrene, 2,3-dimethylstyrene, α-methylstyrene, vinyl naphthalene, vinyl toluene, vinyl xylene, and mixtures thereof.

14. The process of preparation according to claim 1, wherein the temperature of step (i) is between 40° C. and 100° C. and the temperature of step (ii) is between 120° C. and 140° C.

* * * * *